(12) United States Patent
Zoellner et al.

(10) Patent No.: US 6,569,914 B2
(45) Date of Patent: May 27, 2003

(54) ADDITIVE FOR MODIFYING THE COEFFICIENT OF FRICTION OF SILICONE RELEASE COATINGS AND HAVING LOW EXTRACTABLE SILICONE

(75) Inventors: Oliver H. Zoellner, Tecumseh, MI (US); Andrew J. Conti, Tecumseh, MI (US); Kathleen D. Beekel, Adrian, MI (US)

(73) Assignee: Wacker Silicones Corporation, Adrian, MI (US)

( * ) Notice: Subject to any disclaimer, the term of this patent is extended or adjusted under 35 U.S.C. 154(b) by 75 days.

(21) Appl. No.: 09/844,211

(22) Filed: Apr. 27, 2001

(65) Prior Publication Data
US 2002/0193461 A1 Dec. 19, 2002

(51) Int. Cl.[7] .............................. C08F 2/40; C08L 83/04; C08D 183/04
(52) U.S. Cl. .......................... 522/99; 525/474; 525/477; 525/478; 528/12; 528/15; 528/33; 428/447
(58) Field of Search .................... 522/99, 148; 525/477, 525/478, 479, 474, 476; 528/25, 26, 33, 12, 15; 428/447

(56) References Cited

U.S. PATENT DOCUMENTS

| | | | |
|---|---|---|---|
| 4,184,006 A | | 1/1980 | Hockemeyer et al. |
| 4,659,621 A | * | 4/1987 | Finn et al. .................. 428/339 |
| 5,241,880 A | * | 9/1993 | Mizobata et al. ........ 428/36.91 |
| 5,246,995 A | * | 9/1993 | Murakami et al. .......... 524/265 |
| 5,468,815 A | * | 11/1995 | Boardman et al. .......... 525/478 |
| 5,654,366 A | * | 8/1997 | Furukawa et al. .......... 252/101 |
| 6,106,989 A | * | 8/2000 | Bretscher et al. ........... 430/132 |
| 6,274,692 B1 | * | 8/2001 | Herzig et al. ................. 528/32 |

FOREIGN PATENT DOCUMENTS

EP  0 903 385 A1 * 3/1999

* cited by examiner

*Primary Examiner*—Susan W. Berman
(74) *Attorney, Agent, or Firm*—Brooks & Kushman P.C.

(57) ABSTRACT

Low solvent and solvent-free silicone release coatings may be prepared with varying COF levels by incorporating a very high molecular weight, substantially non-reactive organopolysiloxane into a conventional curable release coating. By supplying the COF additive in the form of a relatively low viscosity master batch, adjustment of COF may be made by the coating applicator. Very low COF values can be obtained from tin-free, solvent-free coating systems, while at the same time, the coatings have very low extractables.

25 Claims, No Drawings

ADDITIVE FOR MODIFYING THE COEFFICIENT OF FRICTION OF SILICONE RELEASE COATINGS AND HAVING LOW EXTRACTABLE SILICONE

BACKGROUND OF THE INVENTION

1. Field of the Invention

The present invention pertains to silicone release coatings.

2. Background Art

Silicone release coatings are used in large quantities in diverse commercial fields. For example, in the structural composites field, curable resin-impregnated carbon or glass fiber prepregs are manufactured on release-coated substrates from which the tacky prepregs are separated prior to assembling into laminates and curing. Similar release substrates, generally release coated paper, are used with film adhesives, and as protective, pre-use coverings for a variety of adhesive-coated articles. Pressure sensitive labels, for example, are generally supplied on release coated substrates. It is safe to say that virtually all curable or pressure-sensitive film adhesives and articles coated with them are supplied on a release-coated substrate or backing.

Silicones have become the predominant release coating due to their superior surface qualities and favorable economics. However, because of the diverse applications in which the release coatings are used, and the varying tack of the wide variety of adhesives with which they are used, it is necessary to have the ability to tailor characteristics such as peel strength, and, in particular, the coating coefficient of friction (COF). In the past, changes in COF were rather difficult to make, often requiring the synthesis of new friction-modifying components or even wholly new release formulations. Coatings with low COF have been the most difficult in this regard.

The coatings must be capable of application to the substrate by conventional processes, such as spraying, doctor coating, printing techniques, etc. These application methods require a coating of relatively low viscosity, preferably with some degree of self-leveling characteristics. Following application to the substrate, the coating must be cured. Among the curable compositions and their associated curing mechanisms which have been used are moisture curable compositions, condensation curable compositions, addition curable compositions, and photocurable compositions. Thermocurable and photocurable addition curing systems dominate the market.

In many applications, very low levels of extractables are required. However, some silicone release coatings actually rely on the exudation of liquid organopolysiloxanes from a cured and crosslinked organopolysiloxane matrix for their release properties. Such compositions are described in European published application EP-013703. The exudation is significant enough that the latter published application is directed to employing a special substrate backcoating containing absorbent particles to absorb excess silicone oil when the release film is wound up on a roll. However, such special backcoatings do not prevent later extraction of silicon fluid upon use of the release film.

Other conventional silicone release coatings are disclosed by U.S. Pat. No. 4,184,006, incorporated herein by reference, comprising a vinyl-terminated diorganopolysiloxane, a diorganopolysiloxane having minimally three Si—H bonded reactive hydrogens, a platinum hydrosilylation catalyst, and a hydrosilylation inhibitor. The compositions may be applied by conventional coating and printing techniques. However, low COF coatings are difficult to obtain. For low COF coatings, solvent-based tin catalyzed condensation-curable coatings have traditionally been used. However, tin-catalyzed coatings not only contain appreciable tin residues, they have high levels of extractables as well. Moreover, most solvent based systems do not meet volatile organic compound (VOC) emission standards due to the relatively large amounts of solvents used.

It would be desirable to provide silicone coating compositions, suitable for use as release coatings, with COF values which can be adjusted over a wide range without drastic alteration of the coating composition. It would be further desirable to provide coating composition components which allow for adjustment of COF by the coating applicator rather than only the coating manufacturer. Finally, it would be desirable to provide low VOC content or VOC-free coatings which have a low level of extractables after curing. It would be yet further desirable to provide low COF coatings which do not require the use of tin catalysts.

SUMMARY OF THE INVENTION

It has now been surprisingly discovered that silicone release coatings with adjustable COF, in particular low values of COF, may be formulated as neat, solventless compositions, or as compositions containing minimal organic solvent. These release coatings may be applied by conventional coating techniques, and cure to provide release coatings having very low levels of extractables.

DETAILED DESCRIPTION OF THE PREFERRED EMBODIMENT(S)

The present invention compositions are addition-curable or photocurable organopolysiloxane release coating compositions which contain, as a COF modifier, a very high molecular weight, and hence high viscosity (>500,000 mm$^2$/s) organopolysiloxane which does not react substantially with the remaining ingredients of the curable organopolysiloxane composition. The release coating compositions may be defined and described in several ways, for example by weight percent composition. However, it is advantageous to consider the compositions as comprising a curable organopolysiloxane base composition, and a COF modifier, preferably supplied as a COF modifier master batch composition. By varying the amount of the latter, the COF of the cured coating composition may be varied over wide limits without necessitating fundamental changes in the base composition. Thus, release coatings with varied COF may be formulated by the applicator from a limited number of standard components.

The base composition is an addition crosslinkable system which may be thermally crosslinkable or photochemically crosslinkable. Hybrid systems are useful as well. The base compositions are conventional, and well known to those skilled in the art.

Addition crosslinkable systems contain a "crosslinkable component" which is preferably an organopolysiloxane containing hydrocarbon groups which have carbon—carbon unsaturation. Both ethylenically unsaturated and ethylynically unsaturated groups may be present. Preferably, the unsaturated hydrocarbon radicals are vinyl, vinylether, or ω-terminal alkenyl or alkenylether groups. Allyl groups and allylether groups are also highly useful, as are also acrylates and methacrylates, maleates, fumarates, etc.

The unsaturated hydrocarbon groups may be pendant or terminal, or both pendant and terminal, and the polysiloxanes which bear these groups may be linear or branched, preferably lightly branched such that they contain less than about 5 mol percent total $RSiO_{3/2}$ and $SiO_{4/2}$ groups based on total mol of siloxy groups, where R is an optionally substituted hydrocarbon group. Linear, α,ω-divinylpolydiorganosiloxanes are preferred, more preferably α,ω-divinylpolydimethylsiloxanes. Thus, more generally, the unsaturated group-containing organopolysiloxanes preferably contain the following groups:

| | |
|---|---|
| $R^1_aR_bSiO_{1/2}$ | (I), |
| $R^1_cR_dSiO_{2/2}$ | (II), |
| $R^1_eR_fSiO_{3/2}$ | (III), and |
| $SiO_{4/2}$ | (IV), | where a and b are individually 0, 1, 2, or 3 and the sum of a+b is 3;

where c and d are individually 0, 1, or 2 and the sum of c+d is 2;

where e and f are individually 0 or 1 and the sum of e+f is 1;

where $R^1$ is an unsaturated, optionally substituted hydrocarbon, preferably a $C_{2-18}$ ethylenically unsaturated hydrocarbon, and more preferably, an ω-unsaturated $C_{2-18}$ hydrocarbon, optionally substituted by substituents which are non-reactive with other coating composition components. Examples of such substituents, in a non-limiting sense include, halo, especially fluoro and chloro; cyano; hydroxyl; sulfhydryl; primary, secondary, and tertiary amino, or salts thereof; alkoxy; and polyoxyalkylenyl. In the above formulae, R is an optionally substituted hydrocarbon group free of ethylenic unsaturation, or a hydroxyl or alkoxy group, preferably a phenyl or substituted phenyl group or a $C_{1-18}$ alkyl group, more preferably a $C_{1-8}$ alkyl group, and most preferably a methyl group. The groups R, when hydrocarbon groups, may be substituted by one or more substituents as for $R^1$. In addition curable organopolysiloxanes, this component may be termed the "crosslinkable component". The R alkoxy groups preferably are $C_{1-18}$ alkoxy groups, more preferably $C_{1-2}$ alkoxy groups. All the organosilicon compounds herein may also include such linkages as ≡Si—$R^1$—Si≡ where $R^1$ is $C_{1-18}$ alkylene, polyoxyalkylene, or similar linking groups; i.e., the organopolysiloxane backbone need not be limited to repeating Si—O—Si linkages.

In addition to the organopolysiloxane crosslinkable components, the crosslinkable components may comprise, all or in part, a multiply unsaturated hydrocarbon, in particular, $C_{4-18}$ α, ω-dienes, more preferably $C_{4-8}$ α, ω-dienes. Dienes with internal multiple unsaturation as opposed to terminal unsaturation may also be used. On average, the multiply unsaturated hydrocarbon, as is the case with the unsaturated organopolysiloxanes, should contain two or more unsaturated carbon—carbon bonds, but may contain greater than two unsaturated bonds as well. Both the $R^1$ substituents of the crosslinkable organopolysiloxane, the R substituents of the crosslinkable organopolysiloxane, and the multiply unsaturated hydrocarbons may contain interspersed heteroatoms, and heteroatom-containing groups such as

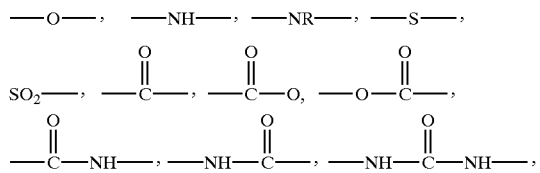

and the like. Moreover, the $C_{1-18}$ hydrocarbon group R, the $C_{2-18}$ unsaturated hydrocarbon group $R^1$, and the multiply unsaturated hydrocarbon may contain internal or external polyoxyalkylene ether groups, which, when external, may be terminated by hydroxyl, —OR, or —$OR^1$ groups, where R and $R^1$ have the before-mentioned meanings. Thus, in summary, the crosslinkable component may comprise any multiply unsaturated polyorganosiloxane or hydrocarbon moiety with suitable reactivity in hydrosilylation reactions to be able to economically form a coating.

In addition to the hydrosilylation reactions which will crosslink the thermocurable addition-crosslinkable coatings, other reactions which form crosslinking linkages may also occur, although these will not be the dominate reaction. Examples are Michael-type additions of aminoalkyl groups with unsaturated groups.

Most preferably, the crosslinkable component comprises a linear polydimethylsiloxane containing terminal or pendant unsaturated groups, and having the formula

where a is 0, 1, or 2, preferably 1, and b is 1 or 2 preferably 2, and the sum of a+b is 3; where c is 0, 1, or 2, preferably 1, more preferably 0; and d is 0, 1, or 2, preferably 1 and more preferably 2; and where n is an integer from 0 to 1000 or more. The crosslinkable component is preferably an α,ω-divinylpolydimethyl siloxane corresponding to the formula

where Me is methyl and Vi is vinyl. Preferred crosslinkable components are liquids having a viscosity of less than 100,000 cps, more preferably less than 50,000 cps, and most preferably less than 10,000 cps. An individual component may have a higher viscosity or be a solid, so long as the overall release coating composition is a liquid of sufficiently low viscosity to be applied by conventional coating and printing methods. Generally, the coating composition should be less than 10,000 cps, more preferably less than 5000 cps, and most preferably 2000 cps or lower.

The "crosslinking components" of the addition-curable release coatings which cure by hydrosilylation, comprise an Si—H functional organopolysiloxane containing, on average, minimally two Si—H groups per molecule. Suitable Si—H functional crosslinking agents preferably contain at least 3 Si—H groups. The crosslinking organopolysiloxane is preferably comprised of the moieties:

| | |
|---|---|
| $H_aR_bSiO_{1/2}$ | (I'), |
| $H_cR_dSiO_{2/2}$ | (II'), |
| $H_eR_fSiO_{3/2}$ | (III'), and |
| $SiO_{4/2}$ | (IV), | where a, b, c, d, e, f, and R have the same meanings as hereinbefore for the crosslinkable component, and R can be similarly substituted or contain interspersed heteroatom groups. The Si—H functional crosslinker may also be cyclic, i.e., tetramethylcyclotetrasiloxane, hexamethylcyclotrisiloxane, pentamethylcyclopentasiloxane, and the like. As with the crosslinkable components, the crosslinking components are preferably linear or only lightly branched, for example containing less than 5 mol percent T (III') and Q (IV) units. Most preferably, the Si—H functional crosslinker bears from 0.05 to about 1.6 weight percent Si-bound hydrogen, which is located along the polymer backbone as opposed to merely the crosslinker termini. More preferably, the amount of Si-bound hydrogen is between 0.2 and 1.6 weight percent, more preferably between 1.0 and 1.46 weight percent. The crosslinker is preferably a liquid, but may be a solid so long as the overall release coating composition is liquid, as described previously. The viscosity of liquid, Si—H functional crosslinkers is preferably from 2 to 10,000 cps, more preferably 4 to 1000 cps, and most preferably 4 to 130 cps.

In addition or in lieu of the crosslinkable components (I) to (IV) and crosslinking components (I') to (III') and (IV), the compositions may comprise organopolysiloxanes containing a combination of moieties (I) to (IV) and (I') to (III'). In other words, all or a portion of the release coating may comprise organopolysiloxanes containing both unsaturated hydrocarbon groups as well as silicon-bonded hydrogen in the same molecule. Such components are not preferred, however.

The hydrosilylation-curable addition curable release coatings necessarily contain a hydrosilylation catalyst. These catalysts are by now well known, and may comprise a number of transition metals and transition metal compounds, particularly those of the precious metals, more particularly compounds of platinum, palladium, or rhodium, and most preferably platinum and platinum compounds. Preferably, vinylsiloxane platinum compounds such as those described in U.S. Pat. Nos. 3,419,593, and 3,715,334 ("Karstedt" catalysts) are utilized. The amount of hydrosilylation catalyst is preferably from 1 to 100 parts by weight per million parts by weight of the sum of crosslinkable components, crosslinker components, and any reactive diluents, as hereinafter described, preferably 5 to 60 parts per million.

The addition-curable release compositions preferably contain a hydrosilylation retarder, or "inhibitor" as well. Numerous inhibitors are known, including a variety of sulfur-containing compounds. Preferred retarders are yneols such as 2-methyl-3-butyne-3-ol and ethynylcyclohexanol. Other suitable retarders are disclosed in U.S. Pat. No. 4,184,006, which is incorporated herein by reference.

The addition-curable composition may contain reactive diluents such as mono-unsaturated, low molecular weight hydrocarbons, for example, 1-hexene, 1-octene, and the like. In general the amount of Si—H crosslinker is adjusted so as to enable complete reaction of such reactive diluents. Otherwise, the amount of extractables may increase, as will also the amount of VOC liberated during the cure cycle. Cycloolefins such as cyclohexene, cyclooctene, and the like are also suitable reactive diluents, as are styrene, α-methylstyrene, p-methylstyrene, allylalcohol, and the like. Low molecular weight and thus low viscosity, 0.1 cps to 150 cps siloxanes and organopolysiloxane oligomers containing but a single unsaturated hydrocarbon moiety may be used as reactive diluents as well. Low molecular weight reactive diluents are generally added to lower the viscosity of the release coating composition without the necessity of including fugitive solvents.

Thermocurable compositions containing organopolysiloxanes having siloxy moieties I to IV, and optionally hydrocarbon di- or polyenes may be formulated to contain catalysts such as hydroperoxy, peroxy, peroxyketone, azo compounds and the like as free radical polymerization initiators. Such catalysts catalyze the addition reaction between unsaturated hydrocarbons, and are also thermocurable compositions. In such compositions, a polyunsaturated component must be present to provide a sufficient degree of crosslinking.

The base compositions of the present invention may also be photocurable. Such compositions contain unsaturated compounds as the reactive ingredients, i.e., the "crosslinkable" unsaturated hydrocarbon group-containing compounds described previously, with the exception that a multiply unsaturated hydrocarbon cannot be used alone; at least a portion of the composition must contain an organopolysiloxane bearing two or more unsaturated hydrocarbon groups, preferably an organopolysiloxane bearing at least two ethylenically unsaturated hydrocarbon groups. However, when multiply unsaturated hydrocarbons are utilized, organopolysiloxanes containing but a single unsaturated group may be used as well. As with free radical polymerizable, thermocurable compositions, the number of polymerizable unsaturated groups must be sufficient to provide the requisite degree of crosslinking.

The photocurable compositions preferably contain no Si—H functional organopolysiloxanes, hydrosilylation catalyst, or hydrosilylation retarder. However, a photocatalyst is required. Suitable photocatalysts include a wide variety of catalysts, including iodonium and sulfonium compounds. Numerous suitable photocatalysts are available from the Ciba Geigy as Irgacure™ catalysts.

The release coating may contain any additives normally employed in release coatings, for example viscosifiers, thixotropes, fillers, plasticizers, dyes, pigments, biocides, antioxidants, UV stabilizers, etc. The coating may also contain conventional friction-modifiers. Resinous organopolysiloxanes, in particular MT and MQ resins, both non-functional, unsaturated hydrocarbon-functional, or Si—H functional, may be added as well. In this sense, with respect to these resin components, "non-functional" means unreactive in hydrosilylation-curable compositions, i.e., having no reactive functional groups, or having a functionality other than unsaturated hydrocarbon or Si—H.

Solvents are preferably excluded from the curable release coating compositions. The term "solvents" does not include reactive diluents. The latter react into the formulation, while solvents are fugitive. When solvents are employed, they constitute less than 20 weight percent of the release coating formulation, preferably less than 10% by weight, and more preferably less than 5% by weight. No solvent, or a solvent content of less than 1 or 2% by weight are most preferred. If solvents are used, solvents which meet the United States EPA requirements for "non-VOC" solvents are preferred.

The compositions heretofore described are termed silicone release coating "base compositions", as they contain the necessary ingredients to lay down and subsequently cure to form a silicone coating layer. Thus, a "base composition" is a curable organopolysiloxane composition capable of curing to a solid film, and a "base composition component" is a component of such a composition.

Whichever base composition is utilized, the inventive compositions also contain preferably from about 0.5 weight percent to about 20 weight percent, more preferably 1 to 10 weight percent, yet preferably 0.75 to 7 weight percent, and still more preferably 1.0 weight percent to about 6 weight percent of a very high molecular weight organopolysiloxane which is substantially non-functional. The viscosity of the very high molecular weight organopolysiloxane is preferably in excess of 650,000 mm²/s, more preferably in excess of 750,000 mm²/s, yet more preferably in excess of 850,000 mm²/s, and most preferably 1,000,000 mm²/s or higher.

The upper molecular weight limit of the COF modifier or "additive" is limited by the increasing viscosity of the release coating at the level of additive utilized; the coating must be coatable or printable using conventional techniques; the lower limit is based on the level of extractables, which is preferably less than 5 % by weight over the amount of extractables of the base composition alone, preferably 3 % by weight or less over the amount of extractables of the base composition, and most preferably not more than 2% over the level of extractables of the base composition. In the lower viscosity range, the amount of extractables tends to be high. Thus, at 500,000 mm²/s or below, while COF is excellent, extractables are high. 400,000 mm²/s represents a practical lower limit of viscosity of the COF additive, unless modified by a limited number of functional groups or other groups which decrease the mobility of the additive and hence its ability to be exuded or extracted.

As indicated in the immediately preceding paragraph, the amount of extractables can be lowered somewhat by providing partial functionality to the additive molecules, i.e., by providing alkenyl functionality (for addition or photocurable systems) or Si—H functionality (for hydrolyzation-addition curable systems) or another functionality which is reactive with the base composition components, i.e., amino functionality, reactive via Michael type-reactions with the crosslinkable component. However, if functionality is provided, it is desirably less than 1.0 functional groups, on average, per additive molecule, more preferably less than 0.5 functional groups, on average, per molecule, otherwise the COF lowering ability will be lost.

The COF polyorganosiloxanes additives preferably contain no reactive functional groups, reactive meaning reactive with one or more of the components of the base composition. As stated previously, a minor amount of reactive functional groups may be tolerated. However, if an excess of functional groups are present, the additive may react with the base composition to such an extent that it becomes part of the cured resin itself, presumably distributed evenly within the matrix of the cured coating. The additive will thus be substantially unavailable at the surface of the coating, where its friction-lowering capabilities are desired. While increasing the amount of additive would increase the amount available at the surface of the coating, the increase in viscosity may not be tolerable in the coating process. However, it would not depart from the spirit of the invention to include a minimal degree of functionality which would not be sufficient to completely immobilize the additive within the coating polymer. Such an amount is, on average, less than 1 reactive functional groups per molecule, preferably less than 0.5 groups per molecule, and most preferably less than 0.1 groups, on average, per molecule. Again, the term "reactive" means reactive with the base composition or a component thereof.

Preferably, higher molecular weight, "non-functional" (essentially unreactive with the base composition components under the storage and/or curing conditions) higher molecular weight organopolysiloxanes, i.e., those with a viscosity (25° C.) in excess of 800,000 mm²/s, preferably about or in excess of 1,000,000 mm²/s, and most preferably in the range of 850,000 mm²/s to 1,500,000 mm²/s are used. COF additives having a viscosity in excess of ca. 2,000,000 mm²/s may be particularly valuable with base compositions of exceptionally low viscosity. Otherwise, the coating composition viscosity may be increased to the extent that coating is difficult. However, there is no specific upper limit to the viscosity of the COF-lowering additive.

Preferred additives are organopolysiloxanes having the formula $$R_3SiO-(SiR_2O)_n-SiR_3$$

where R has the meaning given earlier, but is preferably the methyl group and n is such to provide the desired molecular weight and viscosity. The additives may also be lightly crosslinked, for example containing up to 5 mol percent of $RSiO_{3/2}$ and $SiO_{4/2}$ groups based on the total moles of siloxy groups. Substitution of long chain alkyl groups, halogenated, particularly prefluorinated alkyl groups, and phenyl groups for the preferred methyl groups can be utilized to alter the surface characteristics. The various R groups may also be substituted, to a minor extent, i.e., less than 10 mol percent, by non-reactive functionality such as aminoalkyl, hydroxyl, halo, cyano, etc. Other non-reactive groups may be present as well.

Most preferably, the COF additive is not added to the release base composition directly during manufacture, but is formulated as a relatively lower viscosity master batch which may then be added advantageously either during manufacture or by the coating applicator. In general, it is not economical for the applicator to mix the very high molecular weight additive directly into a low viscosity base formulation or a component thereof, as special mixing equipment is required. While such equipment is commonly available to manufacturers of polysiloxanes, it is not commonly available to end users without additional capital expenditure. The COF master batch additive, to be readily blendable without resort specialized mixing apparatus should have a viscosity less than 30,000 cps, preferably less than 25,000 cps, and more preferably 20,000 cps or lower. A range of 12,000–15,000 cps has been found suitable, for example.

Most preferably, the master batch contains high molecular weight additive dissolved or dispersed in further base composition or a component thereof. For example, an addition curable composition containing a crosslinkable component and a crosslinker component, but not necessarily containing either catalyst or inhibitor, may be used. A fully catalyzed/inhibited base composition is also satisfactory. Such master batches may contain from less than 10 weight percent to more than 60 weight percent of additive, preferably 15 weight percent to 40 weight percent, and most preferably 20 weight percent to 35 weight percent. The maximum concentration of additive will be dependent upon the viscosity of the additive and the viscosity of the non-additive component. The additives may be liquid, wax-like, semi-solid, or solid. The nature of the additive is generally dictated by its structure and molecular weight. Higher molecular weight additives will, in general, be of higher viscosity, and yield higher corresponding master batch viscosity. For a trimethylsilyl-terminated polydimethylsiloxane of 1,000,000 mm²/s viscosity, a concentration of 25 weight percent additive in a conventional base composition has proven satisfactory as a master batch.

In lieu of a base composition as the non-additive medium of the master batch, a reactive diluent may be used. For example, 1-hexene, styrene, methylacrylate, etc., may be used as a reactive diluent. By the term "reactive diluent" is meant a diluent which will react with the base composition and be chemically bound therein. For example, in addition curable systems, reactive diluents may be low molecular weight, low viscosity fluids with ethylenic unsaturation. Reactive diluents may also be hydrido-functional, although these are less preferred. Examples are tetramethyldisiloxane, pentamethyldisiloxane, tetramethylcyclotetrasiloxane, etc. For systems which are thermocurable by free radical addition and for photocurable systems reactive diluents may also be ethylynically unsaturated moieties such as those previously identified.

Solvents, particularly conventional solvents should preferably be avoided, as otherwise, the ability to supply compositions meeting low VOC requirements may be compromised. However, it would not depart from the spirit of the invention to add a most minor amount of organic solvent, preferably less than 20 weight percent, more preferably less than 10 weight percent, and most preferably 5% or less. Less than 2% solvent is considered "substantially solvent free."

If solvents are used, they are preferably solvents which exhibit little or no tendency to photochemically generate ozone and/or smog, in particular solvents which exhibit an amount of photochemical ozone or smog generation which is less than that generated by ethane. These solvents may be termed "non-VOC" solvents, and some are disclosed in U.S. Pat. No. 6,048,471. In general, solvents, whether traditional organic solvents, low-VOC solvents, or non-VOC solvents, are added to promote rapid drying, improve leveling or substrate adhesion, and in particular, to lower coating composition viscosity.

When master batches of COF additive are employed, they may be added to a conventional coating composition preferably in amounts of from 1 weight percent to 60 weight percent based on the weight of the total composition, more preferably 2% to 35%, and most preferably 10% to 30%. The actual amount will vary with the % solids of the master batch, i.e., the weight percent of COF additive. In lieu of including the entire COF additive in the "master batch," a portion of the additive may be included in the base composition or a component thereof, and the remainder supplied as a "master batch." The amounts useful will be the amount required to supply the requisite weight percentage of COF additive as previously disclosed.

Thus, in one embodiment, the subject invention pertains to a silicone coating composition having a low coefficient of friction (COF), and containing from 0.5 to 20 weight percent of a COF reducing additive comprising a linear or lightly branched organopolysiloxane having a viscosity in excess of 400,000 mm$^2$/s; and as a curable silicone base composition, one or more of b)i) a thermocurable, addition-crosslinkable base composition comprising
b)i)1) one or both of a crosslinkable, unsaturated hydrocarbon group-containing organopolysiloxane or multiply unsaturated hydrocarbon compound; b)i)2) an Si—H functional organopolysiloxane crosslinker; and b)i)3) a hydrosilylation catalyst;
b)ii) a thermocurable, addition crosslinkable base composition comprising one or more unsaturated hydrocarbon-functional organopolysiloxanes and a thermally activated catalyst effective to catalyze the addition reaction between said unsaturated hydrocarbon groups; and/or
b)iii) a photocurable, addition crosslinkable base composition comprising one or more unsaturated hydrocarbon-functional organopolysiloxanes and a photo-activated catalyst effective to catalyze the addition reaction between said unsaturated hydrocarbon groups; wherein said COF reducing additive preferably contains on average less than 1 reactive functional group per molecule which react with an Si—H functional organopolysiloxane or an unsaturated hydrocarbon group under the cure conditions of the silicone coating composition.

Further, in a second embodiment, the invention pertains to a master batch suitable for addition to a silicone release coating base composition to change the coefficient of friction (COF) thereof, this master batch comprising from 5 weight percent to 60 weight percent of one or more linear or lightly branched organopolysiloxanes having a viscosity in excess of 400,000 mm$^2$/s, dissolved or dispersed in a low viscosity release coating base composition, a low viscosity release coating base composition component, or a reactive diluent, wherein the master batch contains less than 20 weight percent of organic solvent, and has a viscosity preferably less than 50,000 cps, preferably less than 30,000 cps.

In an additional embodiment, the invention pertains to a method of altering the coefficient of friction (COF) of a curable silicone release coating, this method comprising adding to the curable release coating prior to coating upon a release substrate, an effective amount of a high molecular weight organopolysiloxane having a viscosity in excess of 400,000 mm$^2$/s, in an amount of from about 0.5 to about 10 percent by weight relative to the total coating composition weight.

A further embodiment pertains to the a process for the manufacture of a low coefficient of friction release coating, this process comprising a) selecting a curable silicone release composition; b) preparing a low COF master batch additive of low viscosity by dissolving a high molecular weight polyorganopolysiloxane with a viscosity in excess of 400,000 mm$^2$/s in a low viscosity liquid, the master batch having a viscosity of less than 50,000 cps; and c) mixing the master batch b) into the curable silicone release composition.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

EXAMPLE 1

A master batch is prepared by thoroughly mixing 25 parts AK 1,000,000, a trimethylsilyl-capped polydimethylsiloxane having a viscosity of 1,000,000 mm$^2$/s into 75 parts of a commercially available addition curable silicone release component containing an α,ω-divinyl-terminated polydimethylsiloxane and ethynylcyclohexanol inhibitor, prepared in accordance with U.S. Pat. No. 4,184,006 and available from Wacker Silicones, Adrian, Mich., as Dehesive® 924 polymer. The master batch coating thus contains 25 weight percent low COF additive.

EXAMPLES 2–5

Release coatings are prepared from four different commercially available crosslinkable components for addition-cured release coatings, in each case employing 20 weight percent of the master batch of Example 1. All compositions were mixed on conventional mixing equipment. The mixing order is not critical. However, the catalyst is generally added last. The formulations are presented in Table 1 below:

TABLE 1

| Parts Component | DEHESIVE® 920 | DEHESIVE® 921 | DEHESIVE® 924 | DEHESIVE® 636 |
|---|---|---|---|---|
| DEHESIVE® Polymer | 80.00 | 80.00 | 80.00 | 80.00 |
| COF Master Batch Example 1 | 20.00 | 20.00 | 20.00 | 20.00 |
| Crosslinker V24 | 2.67 | 2.73 | 3.32 | 4.37 |
| Crosslinker V90 | 3.56 | 3.64 | 4.42 | 5.83 |
| Catalyst OL | 1.05 | 1.05 | 1.05 | 1.05 |
| SiH:SiVi Ratio | 2.5:1 | 2.2:1 | 2.0:1 | 1.8:1 |

All the coating compositions are suitable for application by conventional coating techniques, exhibit no mixing problems, and display low coefficients of friction after curing. The cure cycle is the same as that recommended by the manufacturer for the base composition not containing the additive master batch.

EXAMPLES 6

And Comparative Examples C1 and C2

Coefficients of friction of a commercially available, addition-curable silicone release coating, Dehesive® 636 polymer available from Wacker Silicones; the same base composition to which has been added 20 parts by weight of the master batch of Example 1 relative to crosslinkable component of the release component, as in Examples 2–5; and a low COF, tin-cured, solvent-based release coating, are compared with each other. The results are presented below in Table 2.

TABLE 2

| Release Coating System | Coefficient of Friction | Extractables |
|---|---|---|
| DEHESIVE® 920 (no COF additive) | 0.368 | 1.8% |
| DEHESIVE® 636 with 12 parts master batch of Example 1 | 0.271 | 2.6% |
| DEHESIVE® 636 | 0.480 | 1.2% |
| DEHESIVE® 636 with 20 parts CFA100 | 0.162 | 3.2% |
| DEHESIVE® 880 (Solvent tin cure system) | 0.160 | 17% |

Note that the presence of the additive dramatically lowers the coating COF, to levels approximately the same as obtained with a solvent based tin catalyzed system.

EXAMPLE 7

A master batch is prepared as in Example 1, but employing a trimethysilyl-terminated polydimethylsiloxane having a molecular weight of 500,000 mm²/s as a low COF additive. A curable release coating was formulated from this master batch in accordance with Example 6. The cured release coating exhibits a low COF, although the level of extractables was higher than desired.

The organosilicon compounds described herein as containing siloxy moieties (I) to (III), IV, and/or (I') to (III') are not limited to these moieties only, and may contain other linkages known to those in the chemistry of organopolysiloxanes as well. The term "optionally substituted" is to be construed in its ordinary sense by one skilled in the art of curable silicone release coatings, i.e., as a group which will not interfere with the pot life or the cure cycle so as to render the compositions commercially unacceptable, nor one which will destroy the release properties. Examples of such groups have been given herein, but further groups are readily identified by one skilled in the release coating art. The terms "a" and "an" mean one or more unless clearly indicated to the contrary, and the term "major" means 50% or more, by weight or by mol, as the case may be, while "minor" means less than 50% on the same basis.

What is claimed is:

1. A silicone release coating composition having a low coefficient of friction (COF) comprising a) from 0.5 to 20 weight percent of a COF reducing additive comprising a linear or lightly branched organopolysiloxane additive having a viscosity in excess of 400,000 mm²/s and less than 1 functional group on average per molecule which is reactive with one or more of the components of the base composition, wherein the weight percent is based on the total weight of the composition; and b) as a curable silicone base composition, one or more of
  b)i) a thermocurable, addition-crosslinkable base composition comprising
    b)i)1) one or both of a crosslinkable, unsaturated hydrocarbon group-containing organopolysiloxane or multiply unsaturated hydrocarbon compound,
    b)i)2) an Si—H functional organopolysiloxane crosslinker, and
    b)i)3) a hydrosilylation catalyst;
  b)ii) a thermocurable, addition crosslinkable base composition comprising one or more unsaturated hydrocarbon-functional organopolysiloxanes and a thermally activated catalyst effective to catalyze the addition reaction between said unsaturated hydrocarbon groups; and/or
  b)iii) a photocurable, addition crosslinkable base composition comprising one or more unsaturated hydrocarbon-functional organopolysiloxanes and a photo-activated catalyst effective to catalyze the addition reaction between said unsaturated hydrocarbon groups.

2. The composition of claim 1, wherein said COF reducing additive has a viscosity of from 650,000 mm²/s to 5,000,000 mm²/s.

3. The composition of claim 2, wherein said base compositions b)ii) or b)iii) comprise an organopolysiloxane comprising siloxy groups corresponding to the formula:

$$R^1{}_a R_b SiO_{1/2} \quad (I),$$
$$R^1{}_c R_d SiO_{2/2} \quad (II),$$

-continued

| | |
|---|---|
| $R^1_e R_f SiO_{3/2}$ | (III), and |
| $SiO_{4/2}$ | (IV), | where
  a and b are individually 0, 1, 2, or 3 and the sum of a+b is 3;
  where c and d are individually 0, 1, or 2 and the sum of c+d is 2;
  where e and f are individually 0 or 1 and the sum of e+f is 1;
  where $R^1$ is an unsaturated, optionally substituted hydrocarbon; and
  R is an optionally substituted hydrocarbon group free of ethylenic unsaturation and optionally containing interspersed heteroatoms, or a hydroxyl or alkoxy group.

4. The composition of claim 1, wherein said COF reducing additive has a viscosity of from 850,000 mm²/s to 1,500,000 mm²/s.

5. The composition of claim 1, wherein said base composition is an addition curable composition b)i) and comprises
  b)i)1) an organopolysiloxane comprising siloxy units having the formulae

| | |
|---|---|
| $R^1_a R_b SiO_{1/2}$ | (I), |
| $R^1_c R_d SiO_{2/2}$ | (II), |
| $R^1_e R_f SiO_{3/2}$ | (III), or |
| $SiO_{4/2}$ | (IV), | where
  a and b are individually 0, 1, 2, or 3 and the sum of a+b is 3;
  where c and d are individually 0, 1, or 2 and the sum of c+d is 2;
  where e and f are individually 0 or 1 and the sum of e+f is 1;
  where $R^1$ is an unsaturated, optionally substituted hydrocarbon; and
  R is an optionally substituted hydrocarbon group free of ethylenic unsaturation and optionally containing interspersed heteroatoms, a hydroxyl group or an alkoxy group,
  b)i)2) an organopolysiloxane comprising siloxy units having the formulae

| | |
|---|---|
| $H_a R_b SiO_{1/2}$ | (I'), |
| $H_c R_d SiO_{2/2}$ | (II'), |
| $H_e R_f SiO_{3/2}$ | (III'), or |
| $SiO_{4/2}$ | (IV), | where a, b, c, d, e, f, and R have the same meanings as hereinbefore for the crosslinkable component, and
  b)i)3 a hydrosilylation catalyst.

6. The composition of claim 5, wherein the total content of siloxy units III, III', and IV in each of said organopolysiloxanes b)i)1) and b)i)2) is on average less than 5 mol percent total based on the average number of siloxy groups in each of said organopolysiloxanes b)i)1) and b)i)2), and wherein the sum of the average number unsaturated hydrocarbon groups in b)i)1 and the average number of Si—H groups in said organopolysiloxane b)i)2) is 5 or greater.

7. The composition of claim 1, wherein said COP reducing additive contains on average less than 0.5 reactive functional groups on average per molecule which react with an Si—H functional organopolysiloxane or an unsaturated hydrocarbon group under the cure conditions of the silicone coating composition.

8. The composition of claim 1, wherein said base composition b)ii) or b)iii) comprise an organopolysiloxane containing siloxy groups corresponding to the formula:

| | |
|---|---|
| $R^1_a R_b SiO_{1/2}$ | (I), |
| $R^1_c R_d SiO_{2/2}$ | (II), |
| $R^1_e R_f SiO_{3/2}$ | (III), and |
| $SiO_{4/2}$ | (IV), | where
  a and b are individually 0, 1, 2, or 3 and the sum of a+b is 3;
  where c and d are individually 0, 1, or 2 and the sum of c+d is 2;
  where e and f are individually 0 or 1 and the sum of e+f is 1;
  where $R^1$ is an unsaturated, optionally substituted hydrocarbon; and
  R is an optionally substituted hydrocarbon group free of ethylenic unsaturation and optionally containing dispersed heteroatoms, or a hydroxyl or alkoxy group.

9. The composition of claim 1, wherein said base composition b)iii) comprises an organopolysiloxane comprising siloxy groups corresponding to the formula:

| | |
|---|---|
| $R^1_a R_b SiO_{1/2}$ | (I), |
| $R^1_c R_d SiO_{2/2}$ | (II), |
| $R^1_e R_f SiO_{3/2}$ | (III), and |
| $SiO_{4/2}$ | (IV), | where
  a and b are individually 0, 1, 2, or 3 and the sum of a+b is 3;
  where c and d are individually 0, 1, or 2 and the sum of c+d is 2;
  where e and f are individually 0 or 1 and the sum of e+f is 1; where $R^1$ is an unsaturated, optionally substituted hydrocarbon; and R is an optionally substituted hydrocarbon group free of ethylenic unsaturation and optionally containing interspersed heteroatoms, or a hydroxyl or alkoxy group,
  and further comprises a photoactive catalyst which promotes the addition reaction between unsaturated hydrocarbon moieties.

10. A master batch suitable for addition to a silicone release coating base composition to change the coefficient of friction (COF) thereof, said master batch comprising from 5 weight percent to 60 weight percent of one or more linear or lightly branched organopolysiloxane additives having a viscosity in excess of 400,000 mm²/s, dissolved or dispersed in a low viscosity curable release coating base composition, a low viscosity curable release coating base composition component, or a reactive diluent, wherein said master batch contains less than 20 weight percent of organic solvent, and has a viscosity less than 30,000 cps and wherein the weight percent of organopolysiloxane additives is based on the total weight of the master batch.

11. The master batch of claim 10, wherein at least one of said linear or lightly branched organopolysiloxane additives has a viscosity in excess of 650,000 mm²/s.

12. The master batch of claim 11, wherein at least one of said linear or lightly branched organopolysiloxane additives has a viscosity of 850,000 mm²/s to 1,500,000 mm²/s.

13. The master batch of claim 12, wherein said master batch has a viscosity less than 20,000 cps.

14. The master batch of claim 11, wherein said linear or lightly branched organopolysiloxane additive comprises siloxy units

| | |
|---|---|
| $R_3SiO_{1/2}$ | (I''), |
| $R_2SiO_{2/2}$ | (II''), |
| $RSiO_{3/2}$ | (III''), and |
| $SiO_{4/2}$ | (IV''), | where R is an optionally substituted $C_{1-18}$ alkyl or $C_{6-20}$ aryl, alkaryl, or aralkyl group, said linear or lightly branched organopolysiloxane having on average less than 1 functional group per molecule which are reactive with said release coating base composition or a component thereof under curing conditions.

15. A method of altering the coefficient of friction (COF) of a cured silicone release coating, said method comprising adding to a curable release coating prior to coating upon a release substrate, an effective amount of an organopolysiloxane additive having a viscosity in excess of 400,000 mm²/s, in an amount of from about 0.5 to about 20 percent by weight relative to the total coating composition weight, said organopolysiloxane additive having less than 1 functional group per molecule which is reactive with the component of said curable release coating.

16. The method of claim 15, wherein said organopolysiloxane additive has less than 0.5 group per molecule on average which is reactive under curing conditions with said curable silicone release coating or a component thereof.

17. The method of claim 16, wherein said organopolysiloxane has a viscosity of from 850,000 mm²/s to 1,500,000 mm²/s.

18. The method of claim 15, wherein said organopolysiloxane additive has a viscosity of from 850,000 mm²/s to 1,500,000 mm²/s.

19. The method of claim 15, wherein said organopolysiloxane is a trimethylsilyl-terminated polydimethylsiloxane having a viscosity of 850,000 mm²/s to 1,500,000 mm²/s.

20. The method of claim 15, wherein all or a portion of said organopolysiloxane is supplied as a solution or dispersion in a low viscosity liquid.

21. The method of claim 20, wherein said low viscosity liquid comprises said curable silicone release coating composition or a component thereof.

22. The method of claim 20, wherein said organopolysiloxane additive comprises from about 5 weight percent to about 60 weight percent of said solution or dispersion.

23. The method of claim 22, wherein said low viscosity liquid comprises an α,ω-divinylpolydiorganosiloxane and an ethylynically unsaturated hydrosilylation reaction inhibitor.

24. The method of claim 15, wherein the COF is lowered to less than 60% of the value the coating composition exhibits in the absence of said organopolysiloxane additive.

25. A process for the manufacture of a low coefficient of friction release coating, said process comprising:
  a) selecting a curable silicone release composition;
  b) preparing a low COF mister batch of low viscosity by dissolving a high viscosity polyorganopolysiloxane additive with a viscosity in excess of 400,000 mm²/s and bearing on average less than 1 reactive functional group reactive with a component of said curable silicone release composition in a low viscosity liquid, said master batch having a viscosity of less than 50,000 cps;
  c) mixing said master batch b) into said curable release composition a) to form a low COF curable release coating composition; and
  d) applying said low COF curable release coating composition to a substrate and curing to form a low COF release coating on said substrate.

* * * * *

UNITED STATES PATENT AND TRADEMARK OFFICE
CERTIFICATE OF CORRECTION

PATENT NO. : 6,569,914 B2  
DATED : May 27, 2003  
INVENTOR(S) : Oliver H. Zoellner et al.

It is certified that error appears in the above-identified patent and that said Letters Patent is hereby corrected as shown below:

<u>Column 16,</u>  
Line 27, delete "mister" and insert therefor -- master --.

Signed and Sealed this

Twenty-third Day of September, 2003

JAMES E. ROGAN  
*Director of the United States Patent and Trademark Office*